July 9, 1957

C. W. KANDLE 2,798,707

ROTARY TYPE TUNNELING MACHINE

Filed June 18, 1953

INVENTOR.
Charles W. Kandle
BY
ATTORNEYS.

July 9, 1957  C. W. KANDLE  2,798,707
ROTARY TYPE TUNNELING MACHINE
Filed June 18, 1953  3 Sheets-Sheet 2

INVENTOR.
Charles W. Kandle
BY
ATTORNEYS.

July 9, 1957  C. W. KANDLE  2,798,707
ROTARY TYPE TUNNELING MACHINE
Filed June 18, 1953  3 Sheets-Sheet 3

INVENTOR.
CHARLES W. KANDLE
BY
ATTORNEYS

United States Patent Office 2,798,707
Patented July 9, 1957

2,798,707

ROTARY TYPE TUNNELING MACHINE

Charles W. Kandle, Chicago, Ill.

Application June 18, 1953, Serial No. 362,630

8 Claims. (Cl. 262—7)

This invention relates to an earth boring machine as for generally horizontal earth tunneling in which a rotary head is employed for removing material progressively from the end face of the tunnel and means are provided to convey the material away from the face to a suitable carrier at the rear.

The invention provides a tunneling machine having a large rotary head which is biased forwardly in the direction of feed with a smaller concentric rotary head which is operable as stop means to regulate the forward advancement of the larger head.

The large rotary head is of disc shape with a cylindrical forwardly extending rim providing a hollow space in which spiral vanes tend to move the dirt and rock inwardly toward a central conveyor flight. The forward edge of the rim and also of the vanes having cutters mounted thereon. The small central rotary cutting head is extended axially in advance of the first rotary head and has a spiral flight extending rearwardly therefrom through the disc and outwardly through a rotary cylindrical tube which carries the first head. The two heads are rotated in opposite directions and the spiral flight carries the spoil back through the tube and dumps the same in trucks at the rear of the machine.

One of the objects of the invention is to increase the effectiveness of spoil removal by the flights.

A further object is to provide the more effective and positive feeding of the larger rotary head.

A further object is to utilize the central, smaller rotary head as separately controlled screw means for regulating the feed of the larger head.

Another object of the invention is to reduce frictional drag on the outer head and provide a more effective cutting action with less power.

Another object is to provide a more simple and effective mounting and construction for the cutters.

Another object is to provide a more nearly balanced torque for the oppositely rotating heads whereby the body of the machine is not subjected to heavy torque forces.

These and other objects and advantages will be more fully set forth in the following description of an embodiment of the invention shown in the accompanying drawings in which.

Figure 1:
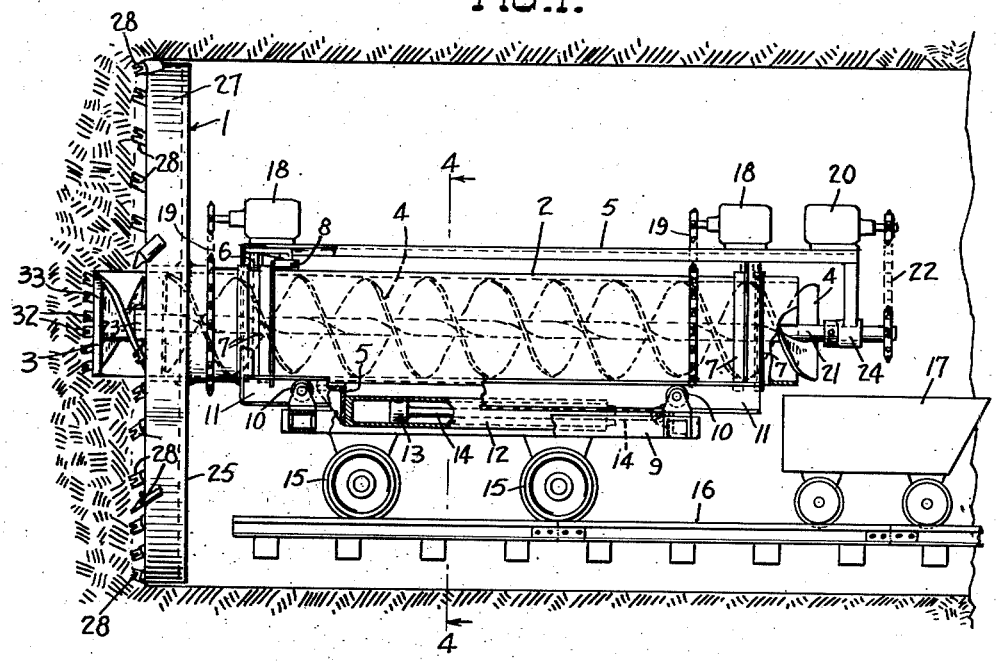
Figure 1 is a side elevation of the machine shown within a tunnel, the latter being vertically sectioned.
Figure 2:
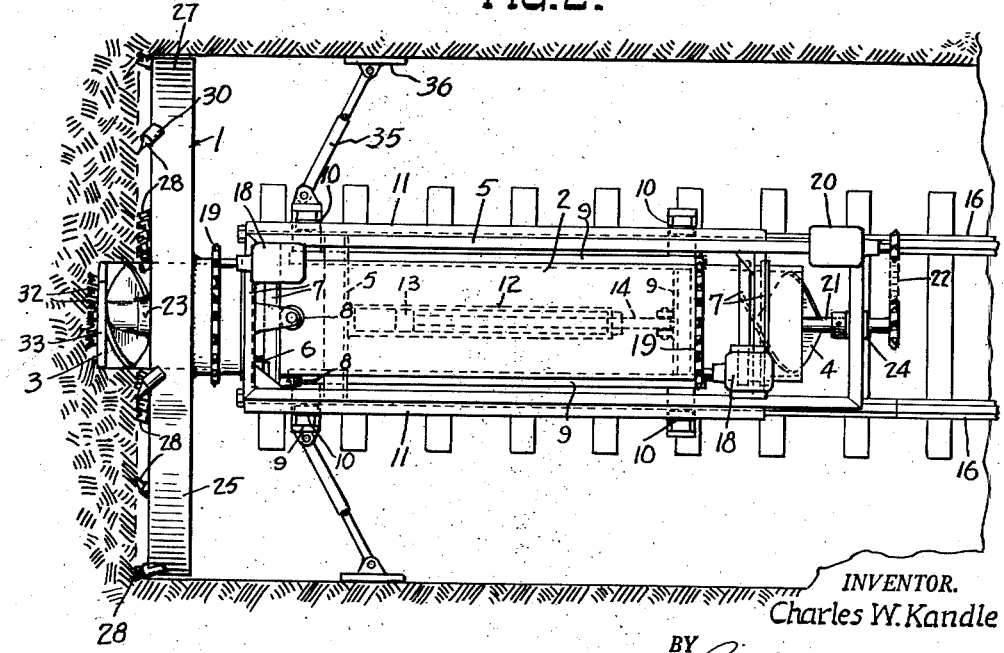
Fig. 2 is a top plan view of the machine shown within the tunnel, similar to Fig. 1.

The tunneling machine illustrated comprises, in general, a large rotary cutting head 1 having a diameter approximately that of the tunnel to be bored and carried by a smaller diameter hollow cylindrical tube 2 disposed axially to the rear thereof, and a small central cutting head 3 carried forwardly of head 1 and at the forward end of a rotary helical conveyor flight 4 rotationally mounted within tube 2.

The tube 2 is mounted for rotation in a rectangular frame 5 by means of guide rollers 6 bearing upon the outer surface of the tube between a pair of spaced guide rings 7 near each end of the tube. Thrust rollers 8 carried by frame 5 bear longitudinally against the rear guide ring 7 of at least one pair to support axially tube 2 and the cutting heads 1 and 3 upon forward advance of the frame 5.

The frame 5 is supported for longitudinal movement upon a carriage 9 by means of suitable rollers 10 bearing against longitudinal track members 11 on the frame. Movement of frame 5 upon carriage 9 is effected by a suitable hydraulic cylinder 12 on the carriage and piston 13 connected to the frame by means of rod 14.

The carriage 9 is supported upon truck wheels 15 riding upon spaced rails 16 at the bottom of the tunnel. The rails 16 are installed in short sections coupled end-to-end to provide a conveyor track for dump trucks 17 which carry the dirt from the machine to the point of removal from the tunnel.

The cutting heads 1 and 3 are actuated for feeding of the same by the hydraulic cylinder 12 and piston 13 for the length of the cylinder while carriage 9 is secured against movement. The retraction of piston 13 in cylinder 12 while carriage 9 advances on rails 16 provides for the next feeding cycle of the cutting heads.

The head 1 is rotated by one or more electric motors 18 carried on frame 5 and each connected by a suitable chain transmission 19 to drive the tube 2.

The head 3 is rotated by an electric motor 20 carried at the rear end of frame 5 and connected to the axial shaft 21 of conveyor flight 4 by a suitable transmission chain 22. Shaft 21 extends axially of tube 2 and is mounted in the bearing 23 at the front end of the tube. A bearing 24 carried at the rear end of frame 5 serves as both a radial and an axial thrust bearing for shaft 21 to effect feeding of cutting head 3 with the advancement of frame 5.

According to the invention the head 1 is constructed as a flat disc 25 rigidly secured to the forward end of tube 2 and at right angles to the axis thereof. Disc 25 has an outer diameter corresponding substantially to that of the tunnel to be bored, and a central opening corresponding to tube 2 in diameter. The disc 25 carries on its front surface one or more spiral vanes 26 extending from the central opening to the outer circumference of the disc.

Where more than one vane 26 is employed, the vanes should be spaced gradually from a minimum distance at the edge of the central opening in the disc to a maximum distance at the circumference of the disc and the space between the vanes should be free of any obstruction at the edge of the center opening in the disc.

Figure 3:
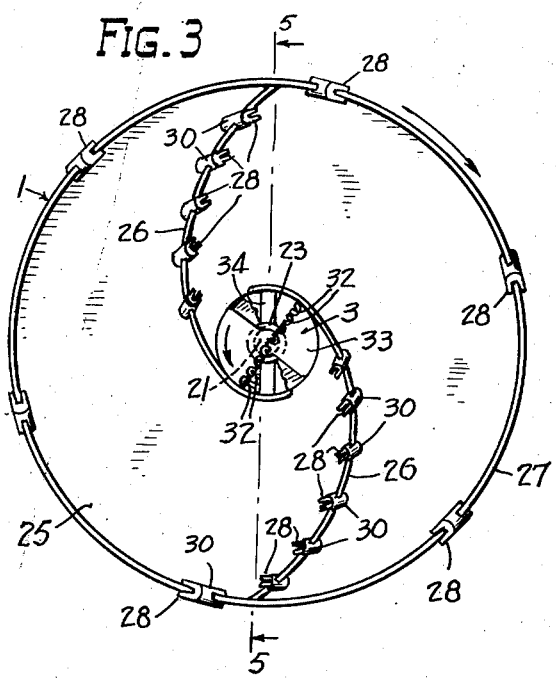
Fig. 3 is a front elevation of the heads.
Figure 5:
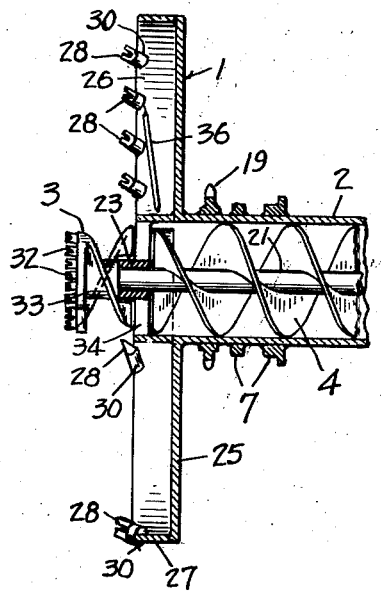
Fig. 5 is a section of the heads taken on line 5—5 of Fig. 3.
Figure 4:
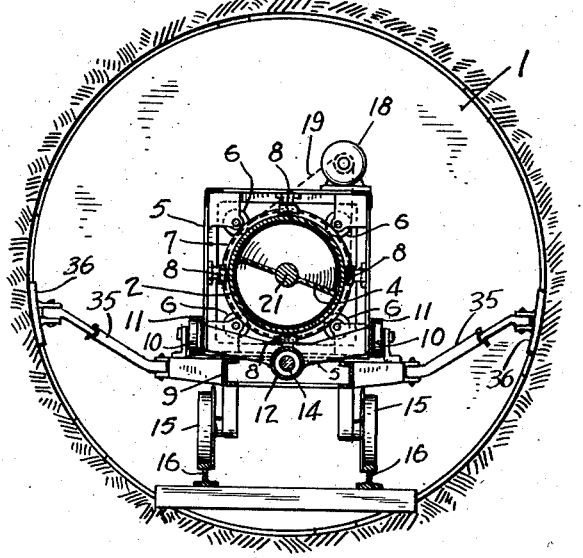
Fig. 4 is a transverse section of the support and carriage for the heads taken on line 4—4 of Fig. 1.
Figure 6:
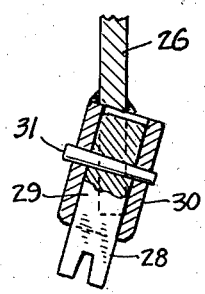
Fig. 6 is a detail section of a cutter mounting.

The pair of vanes 26 shown in Figs. 3 and 5 of the drawing are disposed oppositely of the axis of the head to balance the operation thereof. The vanes are reinforced at their outer edges by the rim 27 welded to the outer edge of disc 25. Rim 27 is cylindrical and has a depth corresponding to that of the vanes 26.

The cutting action of rotary head 1 is provided by means of a series of spaced cutters 28 mounted in the forward edges of vanes 26 and rim 27. The cutters are preferably formed at the outer end of a shank 29 which is mounted in a complemental socket 30 in the vane or rim, as the case may be. The shank 29 has a non-circular section which secures the same in socket 30 at a predetermined angular position for the teeth to effect a cutting of the face of the tunnel as the machine advances. A tapered pin 31 extends transversely through each socket and shank to secure the latter in the socket.

The cutting action of rotary head 3 is provided by means of a series of cutter teeth or blades 32 disposed at the forward edge of two circumferentially spaced segments of a flat disc-like head plate 33 carried at the forward end of shaft 21. The teeth or blades 32 are disposed at a suitable cutting angle and should extend forward from plate 33 only a short distance (about a half an inch) to provide a shaving action upon the end face of the tunnel.

The conveyor flight 4 comprises a helix extending from the leading edge of each segment of head plate 33 to beyond the rear end of tube 2 with the exception of an interruption for the radial supports 34 for bearing 23.

The telescoping arms 35 are pivotally secured at their inner ends to the forward end of carriage 9 and carry the blocks 36 to engage the walls of the tunnel. Arms 35 are adapted to secure the carriage against movement while the pressure within cylinder 12 is effective for feeding of cutting head 1 forwardly within the tunnel.

The pitch of the spiral flight 4 should be related to the speed of rotation to obtain a removal of spoil from the cutting heads and delivery of the same through tube 2 to the dump truck 17. The depth of head 1 should be related to the pitch of flight 4 so that the spoil being brought to the flight by vanes 26 is impelled into the end of tube 2 instead of dropping through the flight or being thrown outwardly thereby. For this purpose the depth of head 1 should not be substantially greater than the pitch of the flight 4.

Where the soil through which the tunnel is to extend is of dirt or sand formation blades should be substituted for the teeth.

Some counter-balancing of the torque forces is obtained by rotating heads 1 and 3 in opposite directions and by providing a relation between the relative frictional forces of the two heads with the ground and the relative speeds of rotation of the heads.

According to the invention, cutting head 3 comprises the series of cutter teeth or blades 32 and the plate 33 and is rotated by motor 20 separately of the rotation of head 1. As cutting head 1 is urged in a forward direction of feed by cylinder 12 and piston 13, the rotation of cutting head 3 controls the actual feeding of head 1. Plate 33 of head 3 engages the face of the tunnel as an abutment which secures the machine against the action of cylinder 12 and piston 13 excepting as the forward feed of head 1 is called for. The forward feed of head 1 by cylinder 12 and piston 13 is allowed as cutter teeth or blades 32 remove the earth in advance of plate 33.

The rotation of cutter head 3 positively controls the forward feed of head 1 so that maximum spoil removal may be effected by operation of head 1.

Electrical control means may be utilized whereby the load or output of motors 18 controls motor 20. Thus, as the current load of motors 18 passes a given optimum maximum because head 1 is being advanced too fast, motor 20 is slowed down. As the load of motors 18 reaches a given minimum because head 1 is not cutting at capacity, motor 20 is speeded up.

Figure 7:
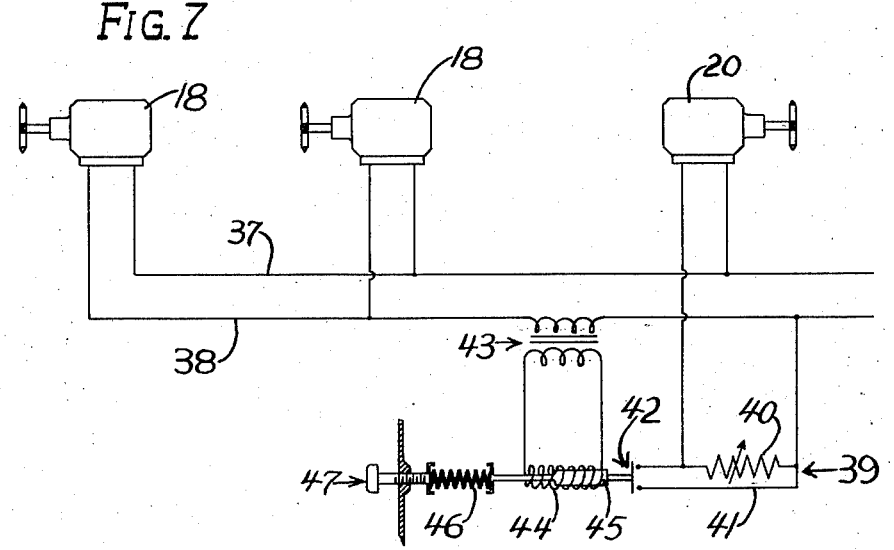
Fig. 7 is a schematic showing of the electrical system of the machine.
Figure 8:
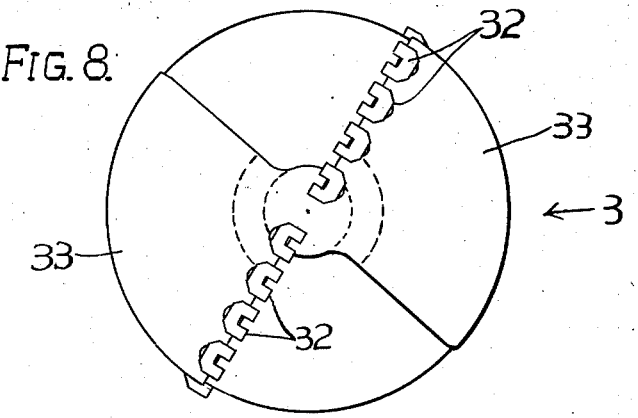
Fig. 8 is a front elevation of the smaller rotary head of the machine.

The electrical system shown diagrammatically in Figure 7 includes the lead wires 37 and 38 which are connected to a source of current and connect motors 18 and motor 20 including control circuit 39 in parallel relation. The control circuit 39 is connected to wires 37 and 38 in series with motor 20 and includes the variable resistance 40 and the circuit 41 controlled by switch 42 which when closed allows the current to by-pass resistance 40.

The transformer 43 includes a primary coil connected by lead wire 38 in parallel relation to motors 18.

The secondary winding is connected to the solenoid 44 which includes the armature 45. The spring 46 interposed between the threaded adjustment member 47 and armature 45 biases the latter in one direction to engage and close circuit breaker 42.

As the load imposed on lead wires 37 and 38 increases the voltage carried by the primary winding, the current induced in the secondary winding of transformer 43 will reach a potential sufficient to actuate solenoid 44 and switches 42 and open circuit 41. When circuit 41 is open, motor 20 driving cutting head 3 operates at the reduced speed selected by resistance 40.

The reduced speed of cutting head 3 reduces the rate of advancement of frame 5 and feed of head 1 by cylinder 12 and piston 13 so that the load on motors 18 is reduced. As the load imposed on the current supply circuit formed by lead wires 37 and 38 is also reduced, the voltage carried by the primary winding and the potential induced in the secondary winding drops to a level at which solenoid 43 allows spring 46 to reclose switch 42 and circuit 41. Motor 20 then again rotates cutting head 3 to allow an accelerated advancement of frame 5 and cutting head 1 by cylinder 12 and piston 13.

The opposite rotation of tube 2 and flight 4 which form a spiral conveyor is readily adequate to remove the spoil even while motor 20 is operating at a reduced speed which may be regulated by adjustment of resistor 40. If desired, similar means may be employed in circuit 41 to regulate the accelerated feed rate and speed of motor 20 when switch 42 is closed.

While the operation of head 3 necessarily involves frictional losses, the size of head 3 is reduced to that necessary to be operative respecting cylinder 11 and piston 12. Tube 2 and flight 4 should be adequate to effect the required spoil removal as described.

The speed of rotation of head 3 should generally be somewhat greater than that for head 1, but should be limited by the tendency of the spoil to be thrown off from the flights 4 instead of being impelled thereby into the end of tube 2 and thence through the tube to dump truck 17.

By keeping head 1 relatively shallow, the spoil is delivered by vanes 26 to the mouth of tube 2 and is more effectively moved into the tube by flights 4. If desired, the vanes 26 may have angular ridges or baffles 36 on their leading sides disposed to move the spoil rearwardly toward the disc 25 as the spoil approaches the mouth of tube 2. The ridges or baffles 36 also tend to keep the spoil away from frictional contact with the end face of the tunnel as the head rotates, thereby reducing friction.

By removing certain cutters 28 and 32 and providing a lesser number of the cutters equally spaced about the axis of rotation, the machine may be initially adapted to boring a particular type of earth and of varying degrees of hardness include hard shale.

Each cutter 28 is disposed normal to a radius of the axis of rotation and at a given angle of incidence to the face of the earth being removed. The series of cutters carried by vanes 26 are progressively spaced from the axis of rotation so that the entire number of cutters have a cutting action which is coextensive of the face.

The machine may be adjusted to operate with maximum efficiency and a minimum of interruptions.

The rate of feed being of a very critical nature because of the large diameter of head 1 and the plurality of cutter teeth 28, is readily controlled by the speed of rotation of head 3. Excepting cutters 28, head 1 rotates without any part engaging the solid portions of either the face of the sides of the bore so that frictional resistance of head 1 excepting cutters 28 is substantially eliminated.

Various embodiments of the invention may be employed within the scope of the accompanying claims.

I claim:

1. In a tunneling machine and the like for cutting a large bore in the earth, a frame, a conveyor tube carried for rotation on its axis by said frame, said tube having open forward and rear ends, a circular rotary head secured to the forward end of said conveyor tube and having a series of spiral vanes extending from the circumference thereof to a central opening registering with the forward end of the tube, said head having a series of projecting cutting teeth to engage the face of the bore, a shaft extending through said tube and head and having a helical conveyor flight extending substantially the length thereof, bearing means axially securing and rotatably supporting said shaft coaxially within said tube, means urging said tube forwardly and the cutting teeth of said head to advance into engagement with the face of the bore, an abutment plate on said shaft at the forward end thereof to engage the face of the bore, means to rotate said tube and circular rotary head in one direction for delivery of the spoil from the face of the bore to the forward end of the conveyor tube, separate drive means to rotate said shaft in the other direction to effect the conveying of the spoil from the forward to the rear end of the tube for discharge therefrom, said abutment plate at the forward end of said shaft having segmental openings and a series of cutter teeth adapted to remove the earth from in advance of said abutment means to allow forward movement of the abutment plate and frame and the control of the advancement of said circular rotary head by said separate drive means.

2. The invention of claim 1 wherein the frame includes a wheeled under-carriage supporting the upper part of the frame and tube for relative longitudinal movement and further includes hydraulic means comprising a piston and a cylinder connected to the under-carriage and upper part of the frame to operate by fluid pressure to urge said tube forwardly and the cutting teeth of said head into engagement with the face of the bore.

3. The invention of claim 1 wherein the several drive means include electric motors and electrical control means which is responsive to the current drawn by the motor driving the rotary head and is connected to the motor driving the shaft whereby the advancement of the cutter teeth of the rotary head is controlled by the load imposed by the rotary head on the motor driving the same.

4. In a tunneling machine and the like for cutting a large bore in the earth, a frame, a conveyor tube carried for rotation on its axis by said frame, an under-carriage supporting the frame and tube for relative longitudinal movement, said tube having open forward and rear ends, a circular rotary head secured to the forward end of said conveyor tube and having a series of spiral vanes extending from the circumference thereof to a central opening registering with the forward end of the tube, said head having a series of projecting cutting teeth to engage the face of the bore, a shaft extending through said tube and head and having a helical conveyor flight extending substantially the length thereof, bearing means axially securing and rotatably supporting said shaft coaxially within said tube, hydraulic means comprising a piston and a cylinder connected to the under-carriage and frame to operate by fluid pressure to urge said tube forwardly and the cutting teeth of said head into engagement with the face of the bore, an abutment plate on said shaft at the forward end thereof to engage the face of the bore, a first electric motor to rotate said tube and circular rotary head in one direction for delivery of the spoil from the face of the bore to the forward end of the conveyor tube, a second electric motor to rotate said shaft in the other direction to effect the conveying of the spoil from the forward to the rear end of the tube for discharge therefrom, said abutment plate at the forward end of said shaft having segmental openings and a series of cutter teeth adapted to remove the earth from in advance of said abutment plate to allow forward movement of the abutment plate and frame, and electrical control means responsive to the current drawn by said first motor driving the rotary head and connected to said second motor driving the shaft whereby the advancement of the cutter teeth of the rotary head is controlled by the load imposed by the rotary head on the motor driving the same.

5. The invention of claim 4 wherein the electrical control means includes a solenoid operated switch controlling the second electric motor and a manually adjustable spring biasing the movable element of the solenoid to adjust the control of said second motor in response to the load on the first motor.

6. The invention of claim 1 wherein the rotary cutting head includes a series of symmetrically arranged sockets set in the forward edge of the cutter head to receive and carry the cutting teeth and various of said cutting teeth are removable to alter the effective cutting action of the rotary head and provide the correlation of the relative rotation of the conveyor tube and spiral vanes and drive means therefor.

7. In a tunneling machine and the like for cutting a large bore in the earth, a circular rotary head having a series of spiral vanes extending from the circumference thereof to a central opening, said head having a series of projecting cutting teeth to engage the face of the bore, a shaft extending through said central opening and having a helical conveyor flight extending substantially the length thereof, means urging said head and the cutting teeth of said head into engagement with the face of the bore, an abutment plate on said shaft at the forward end thereof to engage the face of the bore and limit the cutting action of said head, means to rotate said head, and drive means separate from said head rotating means to rotate said shaft and conveyor flight for removal of the spoil from said head, said abutment plate having segmental openings and a series of cutting teeth disposed to remove the earth from in advance thereof to allow forward movement of the abutment plate and head and control the rate of advancement of the head as by the speed of said drive means.

8. The invention of claim 7 wherein the cutting teeth are removable whereby their number and the cutting action of the head with respect to the plate may be varied to correspond with the removal of the spoil by the conveyor flight.

References Cited in the file of this patent

UNITED STATES PATENTS

| 1,511,957 | Freda | Oct. 14, 1924 |
| 1,653,111 | Lobbey | Dec. 20, 1927 |
| 1,867,245 | Bailey | July 12, 1932 |
| 2,250,670 | Joy | July 29, 1941 |
| 2,466,709 | Karr | Apr. 12, 1949 |
| 2,669,441 | Castanoli et al. | Feb. 16, 1954 |

FOREIGN PATENTS

| 162 of 1868 | Great Britain | Jan. 17, 1868 |